(12) United States Patent
Saiki et al.

(10) Patent No.: US 7,726,325 B2
(45) Date of Patent: Jun. 1, 2010

(54) DEAERATION DEVICE AND ULTRASONIC CLEANING DEVICE USING THE SAME

(75) Inventors: Kazuyuki Saiki, Hamura (JP); Masaru Hase, Hamura (JP); Katsuhiro Koyama, Hamura (JP); Katsutada Sakazaki, Hamura (JP)

(73) Assignee: Kaijo Corporation, Tokyo (JP)

( * ) Notice: Subject to any disclaimer, the term of this patent is extended or adjusted under 35 U.S.C. 154(b) by 977 days.

(21) Appl. No.: 11/451,449

(22) Filed: Jun. 13, 2006

(65) Prior Publication Data

US 2006/0283328 A1 Dec. 21, 2006

(30) Foreign Application Priority Data

Jun. 21, 2005 (JP) .............................. 2005-180216
Nov. 16, 2005 (JP) .............................. 2005-331249

(51) Int. Cl.
*B08B 3/10* (2006.01)
(52) U.S. Cl. ........................ 134/184; 134/186
(58) Field of Classification Search ................. 134/184, 134/186, 94.1
See application file for complete search history.

(56) References Cited

U.S. PATENT DOCUMENTS

| | | | |
|---|---|---|---|
| 5,064,449 A * | 11/1991 | Ford et al. | ..................... 95/261 |
| 5,383,483 A | 1/1995 | Shibano | |
| 5,810,037 A | 9/1998 | Sasaki et al. | |
| 6,019,947 A * | 2/2000 | Kucherov | ..................... 422/128 |
| 6,416,676 B1 * | 7/2002 | Hill | ............................... 95/46 |
| 7,247,244 B2 * | 7/2007 | Kozyuk | ..................... 210/748 |
| 2003/0150477 A1 * | 8/2003 | Suzuki | ....................... 134/1.3 |
| 2004/0163541 A1 | 8/2004 | Hayashi | |

FOREIGN PATENT DOCUMENTS

| | | | |
|---|---|---|---|
| JP | 07-096258 | * | 4/1995 |
| JP | 11-019873 | * | 1/1999 |
| JP | 2002-001321 | * | 1/2002 |
| JP | 2004-216254 | | 8/2004 |
| JP | 2004-249215 | | 9/2004 |
| SU | 456172 | * | 2/1975 |
| SU | 1187842 | * | 10/1985 |
| SU | 1214808 | * | 2/1986 |
| SU | 1431799 | * | 10/1988 |

* cited by examiner

*Primary Examiner*—Frankie L Stinson
(74) *Attorney, Agent, or Firm*—Wenderoth, Lind & Ponack, L.L.P.

(57) ABSTRACT

A deaeration device for bubbling dissolved air in the cleaning liquid by cavitation is connected on a cleaning-liquid circulation path so as to bubble the dissolved air in the cleaning liquid flowing through the cleaning-liquid circulation path by the deaeration device, and the bubbled dissolved air flows back to the cleaning tank together with the cleaning liquid so that the bubbled dissolved air is ejected from the liquid surface of the cleaning tank to the outside of the tank. Moreover, a propeller-type pump is used as the circulating pump, and the dissolved air concentration of the cleaning liquid is controlled within a range of 2.5 to 3.5 mg/l.

12 Claims, 6 Drawing Sheets

DEAERATION DEVICE AND ULTRASONIC CLEANING DEVICE USING THE SAME

BACKGROUND OF THE INVENTION

1. Field of the Invention

The present invention relates to a deaeration device for removing dissolved air in cleaning liquid and an ultrasonic cleaning device using this deaeration device.

2. Description of a Related Art

For an industrial cleaning device, it is crucial to completely remove stains or burrs adhered to parts and members for finishing. An ultrasonic cleaning device has been used as a cleaning device to do so.

The ultrasonic cleaning device separates and removes stains or burrs adhered to the surface of an object to be cleaned by vibration energy of an ultrasonic wave. An ultrasonic wave generator is mounted in a cleaning tank filled with cleaning liquid and the ultrasonic wave is irradiated toward the object to be cleaned which is immersed in the cleaning liquid.

With this type of ultrasonic cleaning device, it is known that sound pressure of the ultrasonic wave, that is, vibration energy of the ultrasonic wave, is greatly affected by concentration of dissolved air contained in the cleaning liquid. Dissolved air in large quantity prevents propagation of the ultrasonic wave, which causes energy loss and lowers sound pressure and cleaning capability. Accordingly, a deaeration device is attached to the ultrasonic cleaning device so as to reduce the dissolved air concentration in the cleaning liquid for efficient and stable cleaning.

An example of the above deaeration device is described in the Patent Document 1. The deaeration device in this Patent Document 1 is an example of a film-type deaeration device using a deaeration film which passes only air. A deaeration chamber, which is a sealed space, is divided by a deaeration film into two chambers, one of which is for flowing a liquid to be deaerated, while the other of which is connected to a vacuum pump and vacuumed by a negative pressure so that the dissolved air in the liquid is suctioned and removed through the deaeration film.

[Patent Document 1] Japanese Patent Application Laid-Open No. 2004-249215 (all the pages, all the drawings).

SUMMARY OF THE INVENTION

Problems to be Solved by the Invention

However, in the case of the above conventional film-type deaeration device, the deaeration film is expensive and cost of the device is high and further, there is a disadvantage in that it is necessary to replace or backwash the deaeration film with a certain interval, which necessitates cost and labor for maintenance of the device. Moreover, the film deaeration device can be applied only to water-based cleaning liquid in general, and it is difficult to be applied to hydrocarbon-based or solvent-type cleaning liquids.

Other than the above film-type deaeration device, a vacuum-type deaeration device and a turbo-type deaeration device are known. With the vacuum-type deaeration device, a sealed deaeration tank is filled with a certain amount of cleaning liquid, and air in an upper space of the tank is vacuumed by a vacuum pump so that dissolved air in the cleaning liquid is taken out and ejected. With the turbo deaeration device, after a sealed deaeration tank is filled with a certain amount of cleaning liquid, the cleaning liquid in the deaeration tank is ejected in a large flow rate while decreasing a supply amount of the cleaning liquid flowing into the deaeration tank to generate a pressure difference between an inlet side and an outlet side of the deaeration tank so that the dissolved air in the cleaning liquid in the deaeration tank is taken out and ejected by this pressure difference. However, these devices have respective merits and demerits, and deaeration efficiency, cost, and maintenance of the device cannot be achieved at the same time.

The present invention was made in order to solve the above problems and has an object to provide a deaeration device which is excellent in deaeration efficiency, cost performance and easy maintenance and an ultrasonic cleaning device using this deaeration device. Another object of the present invention is to provide an ultrasonic cleaning device which generates micro bubbles (fine air bubble with a diameter of 10 to several tens μm) at an outlet side of a circulation pump through driving under a specific condition and performs ultrasonic cleaning of an object to be cleaned in the presence of these micro bubbles.

Means to Solve the Problems

As described above, the conventional deaeration devices do not achieve deaeration efficiency, cost and maintenance at the same time. After having conducted experiments and research to solve these problems, the inventors have developed a deaeration device which has high deaeration efficiency, less cost and easy maintenance even with a simple structure, and an ultrasonic cleaning device using it.

That is, a deaeration device according to a first aspect of the present invention comprises a flow passage through which cleaning liquid passes, in which a throttle portion where inside sectional area of the flow passage is narrowed is provided in the flow passage which generates cavitation (bubbling phenomenon of dissolved air by rapid pressure change) at the rear of the throttle portion and dissolved air in the cleaning liquid is bubbled by the cavitation.

The above deaeration device is used by being connected on the way of a cleaning-liquid circulation path for circulating the cleaning liquid in a cleaning tank. When the cleaning liquid is circulated by a circulating pump, the dissolved air in the cleaning liquid flowing through the cleaning-liquid circulation path is bubbled by cavitation in the deaeration device, and the bubbled dissolved air flows back to the cleaning tank together with the cleaning liquid. Then, the bubbled dissolved air is ejected from the liquid surface of the cleaning tank to outside of the tank.

A deaeration device according to a second aspect is characterized in that the flow passage is constituted by a deformable elastic tube, a tube-sectional-area varying mechanism is attached which can vary inside sectional area of the tube by pressing the elastic tube, and the throttle portion is formed by pressing operation of the tube-sectional-area varying mechanism.

Since the deformable elastic tube is used, when the tube is pressed by the tube-sectional-area varying mechanism, the pressed portion is squeezed, and the inside sectional area of the tube is reduced and the throttle portion is formed. Therefore, when the cleaning liquid passes through the throttle portion, the flow velocity is accelerated, and dynamic pressure of the cleaning liquid is rapidly raised, while static pressure is rapidly lowered. On the other hand, after passing through the throttle portion, the tube sectional area is widened and the flow velocity is slowed, and the dynamic pressure of the cleaning liquid is rapidly lowered, while the static pressure is rapidly raised.

When the above rapid pressure change occurs in the throttle portion of the elastic tube, cavitation is generated on the downstream side of the throttle portion, and the dissolved air contained in the cleaning liquid is bubbled on the downstream side of the throttle portion. The bubbled dissolved air is returned into the ultrasonic cleaning tank together with the cleaning liquid, raised toward the liquid surface of the cleaning tank by buoyancy and ejected from the liquid surface of the cleaning tank to the outside of the tank.

A generation amount of air bubbles by the above cavitation is varied according to the sectional area of the throttle portion, and if the sectional area is small, the pressure change in the throttle portion is large and thus, the bubble generation amount is increased, while if the sectional area is large, the pressure change in the throttle portion is small and the bubble generation amount is reduced. Therefore, by changing the sectional area of the elastic tube by the tube-sectional-area varying mechanism, the bubble generation amount can be controlled. As a result, the dissolved air concentration in the cleaning liquid can be controlled and is adjusted to a target value.

The deaeration device with the above structure uses cavitation due to pressure change of the cleaning liquid, and the structure is extremely simple and can be provided at an inexpensive cost. Moreover, if the elastic tube in contact with the cleaning liquid is composed by fluoro-rubber or the like, not only water-based cleaning liquid but also cleaning liquid of hydrocarbon-based or solvent-type can be used, and thus extremely wide versatility is obtained.

A deaeration device according to a third aspect is characterized in that the flow passage is constituted by an undeformable rigid pipe and the throttle portion is formed by narrowing a diameter thereof at an appropriate position of the rigid pipe so that the throttle portion is not adjustable but fixed.

A deaeration device according to a fourth aspect is characterized in that a flow passage through which cleaning liquid passes is provided and an obstacle is disposed in the flow passage to generate turbulence by resisting the flow of cleaning liquid through the flow passage, and cavitation is generated at the rear of the obstacle so that the dissolved air in the cleaning liquid is bubbled.

A deaeration device according to a fifth aspect is characterized in that a throttle portion with a small diameter is formed at an inlet of a pump chamber of a circulating pump for supply/feed of cleaning liquid and cavitation is generated at the rear of the throttle portion so that the dissolved air in the cleaning liquid is bubbled.

A deaeration device according to a sixth aspect is characterized in that a blade profile of a propeller of a circulating pump for supply/feed of cleaning liquid is made asymmetrical and cavitation is generated around the rotating propeller so that the dissolved air in the cleaning liquid is bubbled.

An ultrasonic cleaning device according to a seventh aspect is to deaerate cleaning liquid using any one of the above deaeration devices and characterized in that, in the ultrasonic cleaning device provided with a cleaning tank attached with an ultrasonic wave generator for ultrasonic cleaning of an object to be cleaned by immersing the object to be cleaned in the cleaning tank filled with the cleaning liquid and irradiating an ultrasonic wave from the ultrasonic wave generator, a cleaning-liquid circulation path is formed so that the cleaning liquid in the cleaning tank is suctioned by the circulating pump and circulated through a predetermined path and then, returned into the cleaning tank, the deaeration device in any one of the above aspects is connected on the way of the cleaning-liquid circulation path, dissolved air in the cleaning liquid flowing through the cleaning-liquid circulation path is bubbled by the deaeration device and the bubbled dissolved air flows back into the cleaning tank together with the cleaning liquid so that the bubbled dissolved air is ejected from the liquid surface of the cleaning tank to the outside of the tank.

An ultrasonic cleaning device according to a eighth aspect is characterized in that an air supply means with variable valve opening degree is connected on the downstream side of the deaeration device so that air can be supplied by the air supply means into the cleaning liquid flowing through the cleaning-liquid circulation path.

As described above, ultrasonic sound pressure during ultrasonic cleaning is largely changed according to the dissolved air concentration in the cleaning liquid. On the other hand, the dissolved air concentration is dispersed in a wide range depending on state quantity such as the shape of the cleaning tank (area in contact with atmosphere, water depth, etc.), circulating state of the cleaning liquid, temperature of the cleaning liquid, outside temperature, humidity, etc. And it is sometimes difficult to unambiguously specify the ultrasonic sound pressure only by a specific state quantity.

Then, in the present invention, efficient and stable ultrasonic cleaning with optimally maintained sound pressure of the ultrasonic wave has been realized by analyzing time-series data of input/output signals of the ultrasonic cleaning device using a computer or the like at control of the dissolved air concentration in the ultrasonic cleaning device, by configuring the input/output relation of the ultrasonic cleaning device on software as a multivariate autoregressive model having plural state quantities such as dissolved air concentration, liquid temperature, flow rate, room temperature, humidity or the like, and by controlling the dissolved air concentration based on the multivariate autoregressive model configured on software.

That is, an ultrasonic cleaning device according to a ninth aspect is characterized in that the multivariate autoregressive model showing the input/output relation of the ultrasonic cleaning device is configured from the time-series data of the plural state quantities including at least the dissolved air concentration of the cleaning liquid, and the dissolved air concentration of the cleaning liquid is controlled based on the multivariate autoregressive model.

An ultrasonic cleaning device according to a tenth aspect is characterized in that a learning function is given to the multivariate autoregressive model, the time-series data on state quantity is measured/collected regularly or when necessary and the multivariate autoregressive model configured based on the previous time-series data is modified by the obtained time-series data.

An ultrasonic cleaning device according to a tenth aspect is characterized in that a cleaning-liquid suction port of the cleaning-liquid circulation path is opened in an upper part side of the cleaning tank, and a cleaning-liquid discharge port is opened in a lower part side of a tank wall opposite to the suction port.

An ultrasonic cleaning device according to a twelfth aspect is characterized in that a flow of the cleaning liquid in the cleaning tank is changed by varying a circulating amount of the cleaning liquid through control of the circulating pump so that the dissolved air concentration in the cleaning tank becomes uniform.

An ultrasonic cleaning device according to a thirteenth aspect is characterized in that the dissolved air concentration of the cleaning liquid is controlled to be not less than 2.5 mg/l.

An ultrasonic cleaning device according to a fourteenth aspect is characterized in that a propeller-type pump is used as the circulating pump, and the dissolved air concentration of the cleaning liquid is controlled to be in a range of 2.5 to 3.5 mg/l.

EFFECT OF THE INVENTION

According to the deaeration device of the first aspect, since the dissolved air in the cleaning liquid is emerged as air bubbles using cavitation to be separated and ejected from the cleaning liquid, the dissolved air can be easily and surely removed from the cleaning liquid even with an extremely simple structure. Therefore, constitution of the deaeration device and hence the entire ultrasonic cleaning device can be simplified, and costs can be reduced.

According to the deaeration device of the second aspect, since the deformable elastic tube is used and the throttle portion having an arbitrary size of inside sectional area can be formed by pressing the elastic tube with the tube-sectional-area varying mechanism, bubbling of the dissolved air in the cleaning liquid can be freely controlled. Also, if fluoro-rubber or the like is used as a material for the elastic tube, not only water-based cleaning liquid but hydrocarbon-based or solvent-type cleaning liquid can be used.

According to the deaeration device of the third aspect, since the undeformable rigid pipe is used and the throttle portion is formed, by narrowing the diameter of the rigid pipe at an appropriate position thereof, the deaeration device with high strength and excellent durability can be obtained.

According to the deaeration device of the fourth aspect, since the obstacle is disposed in the flow passage to generate turbulence by resisting the flow of cleaning liquid through the flow passage and cavitation is generated at the rear of the obstacle so that the dissolved air in the cleaning liquid is bubbled, a throttle portion which requires difficult processes is not needed any more and the deaeration device can be produced more easily.

According to the deaeration device of the fifth aspect, since the throttle portion with a small diameter is formed at the inlet of the pump chamber of the circulating pump and cavitation is generated at the rear of the throttle portion so that the dissolved air in the cleaning liquid is bubbled, the deaeration device and the circulating pump can be constituted integrally, and the size of the ultrasonic cleaning device using the deaeration device of the present invention can be reduced.

According to the deaeration device of the sixth aspect, since the blade profile of the propeller of the circulating pump is made asymmetrical and cavitation is generated around the rotating propeller so that the dissolved air in the cleaning liquid is bubbled, the deaeration device and the circulating pump can be constituted integrally, and the size of the ultrasonic cleaning device using the deaeration device of the present invention can be reduced.

According to the ultrasonic cleaning device of the seventh aspect, since the cleaning liquid in the cleaning tank is deaerated using the deaeration device described above, the dissolved air in the cleaning liquid can be surely separated and deaerated. Also, since the deaeration device with simple structure is used, the device can be provided with reduced size and price.

According to the ultrasonic cleaning device of the eighth aspect, since air can be supplied by the air supply means into the cleaning liquid flowing through the circulation path, the dissolved air concentration can be freely controlled.

According to the ultrasonic cleaning device of the ninth aspect, since the multivariate autoregressive model showing the input/output relation of the ultrasonic cleaning device is configured from the time-series data of the plural state quantities including at least the dissolved air concentration, and the dissolved air concentration in the cleaning liquid is controlled based on the multivariate autoregressive model, stable ultrasonic cleaning can be carried out even when the cleaning state is changed (seasonal environmental change such as temperature or humidity, change in cleaning frequencies per day or operating method, etc.). Also, stable cleaning can be carried out even when distribution of the dissolved air concentration is changed due to the shape of the cleaning tank (contact area with atmosphere, water depth, etc.).

According to the ultrasonic cleaning device of the tenth aspect, since the learning function is given to the multivariate autoregressive model, the configured multivariate autoregressive model can be evolved closer to the behavior of the actual ultrasonic cleaning device, and more excellent ultrasonic cleaning can be realized.

According to the ultrasonic cleaning device of the eleventh aspect, since the cleaning-liquid suction port of the cleaning-liquid circulation path is opened on the upper part side of the cleaning tank and the cleaning-liquid discharge port is opened on the lower part side of the tank wall opposite to the suction port, the cleaning liquid flows diagonally upward crossing the cleaning tank, and agitation of the cleaning liquid can be stimulated so that homogenization of the dissolved air concentration can be accelerated.

According to the ultrasonic cleaning device of the twelfth aspect, since the flow of cleaning liquid in the cleaning tank is changed by varying a circulating amount of the cleaning liquid through control of the circulating pump, agitation of the cleaning liquid in the cleaning tank can be further stimulated, which can further accelerate homogenization of the dissolved air concentration.

According to the ultrasonic cleaning device of the thirteenth aspect, the sound pressure of ultrasonic wave can be maintained in the lowest attenuation state and stable ultrasonic cleaning can be carried out. According to the experiments by the inventors, it was found out that the dissolved air concentration of the cleaning liquid is preferably not less than 2.5 mg/l to maintain the ultrasonic sound pressure in the low attenuation state. By having such a concentration, attenuation of the ultrasonic wave can be reduced to as low level as possible, which results in efficient cleaning.

According to the ultrasonic cleaning device of the fourteenth aspect, micro bubbles can be generated at the outlet side of the circulating pump, and stable ultrasonic cleaning not affected by change in the environment (room temperature, humidity, atmospheric pressure, etc.) can be carried out by various effects of these micro bubbles. Note that the micro bubble refers to a fine air bubble with a diameter of 10 to several tens μm at the generation of the air bubble.

That is, when it is so constituted that the cleaning liquid is circulated using a propeller-type pump as the circulating pump, the air bubbles generated by cavitation in the deaeration device are sheared by the rotating propeller of the circulating pump into finer level to be extremely minute air bubbles. According to the experiments by the inventors, it was found out that when the dissolved air concentration of the cleaning liquid is controlled in the rage of 2.5 to 3.5 mg/l, the air bubbles generated through shearing by the rotating propeller become the air bubbles with an extremely small diameter, so-called "micro bubbles."

This micro bubble has the following characteristics that the conventional millimeter-sized air bubbles do not have:

(A) The rising speed is extremely small, and it self-contracts while moving in the cleaning liquid like drifting to become a smaller air bubble almost in the micro nano size;

(B) Substantially uniform bubbles are generated, and excellent in dispersing property;

(C) To have a mild fluidity and a diffusion characteristic in a wide range;

(D) To have a resonance phenomenon to ultrasonic irradiation;

(E) To have an inherent physicochemical characteristic; and (F) Inducing bioactivity to a living body.

Each of the above characteristics, especially the characteristics in (A) to (E) further promotes uniform dispersion of the cleaning liquid in the cleaning tank and homogenizes the dissolved air concentration over the whole area of the cleaning tank, which realizes ultrasonic cleaning not affected by change in the environment such as room temperature, humidity or atmospheric pressure. Also, stains in the cleaning liquid become hardly to coagulate and a large mass of stains is not produced. For this, it is conceivable that although the stains are raised while drifting through the cleaning liquid in the state adsorbed to the micro bubbles, the micro bubbles are negatively charged and the micro bubbles repel each other by static electricity and will not coagulate.

BRIEF DESCRIPTION OF THE DRAWINGS

FIG. 2A and FIG. 2B shows construction of a deaeration device used in the ultrasonic cleaning device in FIG. 1, in which FIG. 2A is a view showing a state where an elastic tube is not pressed and FIG. 2B is a view showing a state where the elastic tube is pressed and deformed to form a throttle portion;

DESCRIPTION OF THE PREFERRED EMBODIMENTS

Preferred embodiments of the present invention will be described below referring to the attached drawings.

Figure 1:
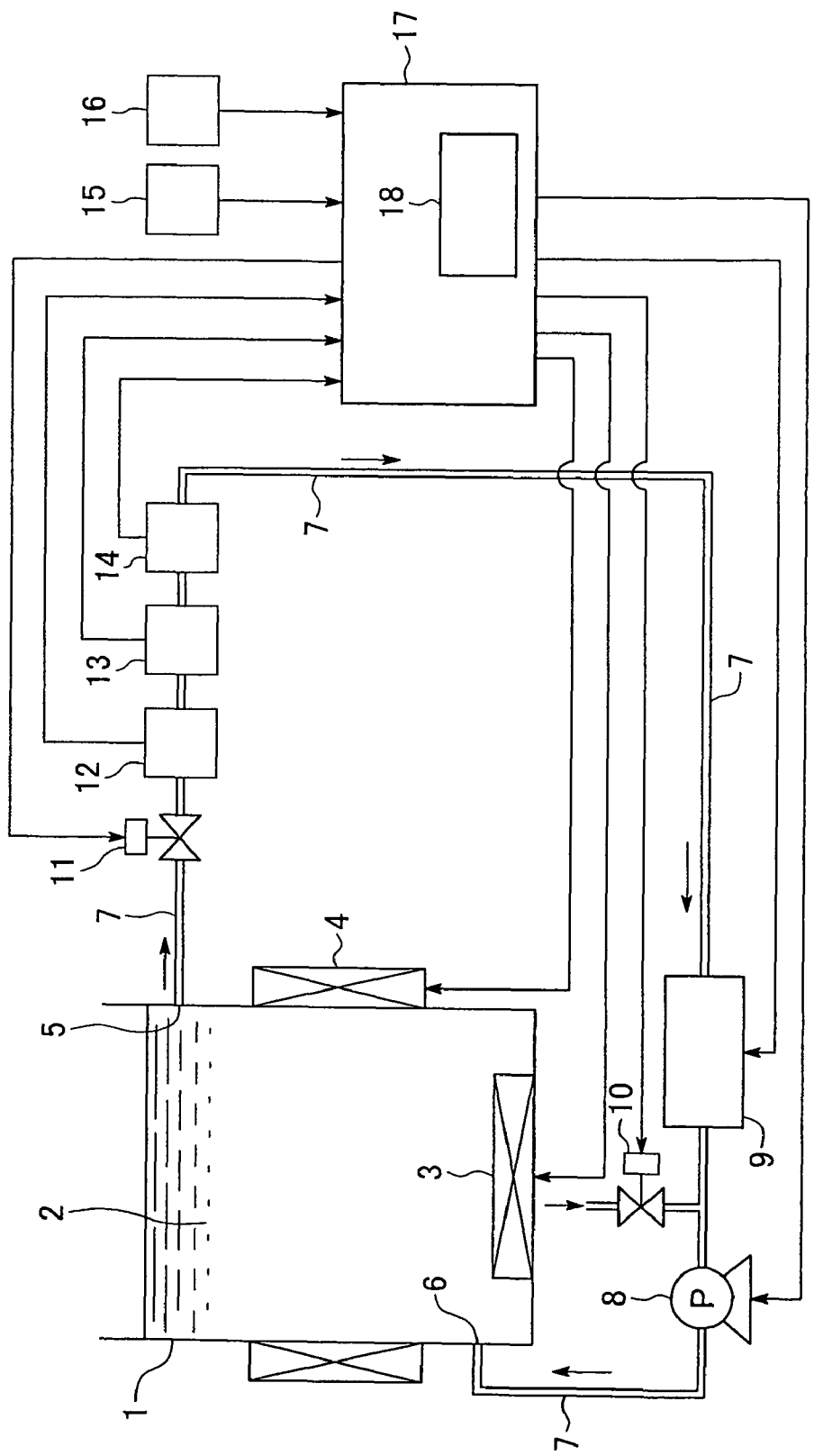
FIG. 1 is a diagram showing a preferred embodiment of an ultrasonic cleaning device according to the present invention.

FIG. 1 is a diagram showing a preferred embodiment of the ultrasonic cleaning device according to the present invention, and FIG. 2 is a view showing constitution of a deaeration device used in this preferred embodiment.

In FIG. 1, reference numeral 1 denotes a cleaning tank filled with a cleaning liquid 2, and an ultrasonic wave generator 3 is attached to a bottom face of this cleaning tank 1. Moreover, a heater (liquid temperature control means) 4 is attached around the cleaning tank 1 so that the temperature of the cleaning liquid 2 is controllable.

A suction port 5 for the cleaning liquid is opened at an upper position of the cleaning tank 1, while a discharge port 6 is opened at a lower portion on a tank wall side opposite to the suction port 5, and a cleaning-liquid circulation path 7 is formed by connecting the suction port 5 and the discharge port 6 with each other through piping using pipes and the like.

On the way of the cleaning-liquid circulation path 7, a circulating pump 8 for forcedly circulating the cleaning liquid is connected, and a deaeration device 9 of the present invention is connected to the upstream side of the circulating pump 8. Moreover, an air supply valve (air supply means) 10 with variable valve opening degree is connected between the deaeration device 9 and the circulating pump 8.

Furthermore, on the upstream side of the deaeration device 9, a flow-rate control valve (flow-rate control means) 11, a flow-rate sensor (flow-rate measuring means) 12, a liquid temperature sensor (liquid temperature measuring means) 13 and a dissolved air concentration sensor (dissolved air concentration measuring means) 14 are connected. Still further, a room temperature sensor (room temperature measuring means) 15 and a humidity sensor (humidity measuring means) 16 are placed for measuring the temperature and humidity around the device. Since the dissolved air concentration in the liquid is generally in proportion to an amount of dissolved oxygen $O_2$, a dissolved oxygen measuring instrument is usually used as the dissolved air concentration sensor 14.

The deaeration device 9 is an air bubble generating means for separating air dissolved in the cleaning liquid 2 (dissolved air) from the cleaning liquid and changing it to an air bubble ejectable as gas. Moreover, the air supply valve 10 is an air supply mechanism for supplying air into the cleaning liquid flowing through the cleaning-liquid circulation path 7 so as to increase the dissolved air concentration in the cleaning liquid 2. By controlling this deaeration device 9 and the air supply valve 10, the dissolved air concentration in the cleaning liquid 2 can be freely controlled.

The control device (control means) 17 is to control the operation of the entire device, to which measurement signals from the flow-rate sensor 12, liquid temperature sensor 13, dissolved air concentration sensor 14, room temperature sensor 15 and humidity sensor 16 are inputted so that the circulating pump 8, deaeration device 9, air supply valve 10, flow-rate control valve 11 and heater 4 are controlled based on these measurement signals and the dissolved air concentration of the cleaning liquid 2 is controlled to be a specified value or in a specified range.

A data processing device such as a computer 18 is built in or attached to the control device 17. The computer 18 is, as shown in a control example 4, which will be described later, to analyze a required state quantity of time-series data including the dissolved air concentration, to establish an input/output relation of the entire ultrasonic cleaning device as a multivariate autoregressive model on software, and to control the dissolved air concentration based on thus obtained multivariate autoregressive model.

Figure 2A:
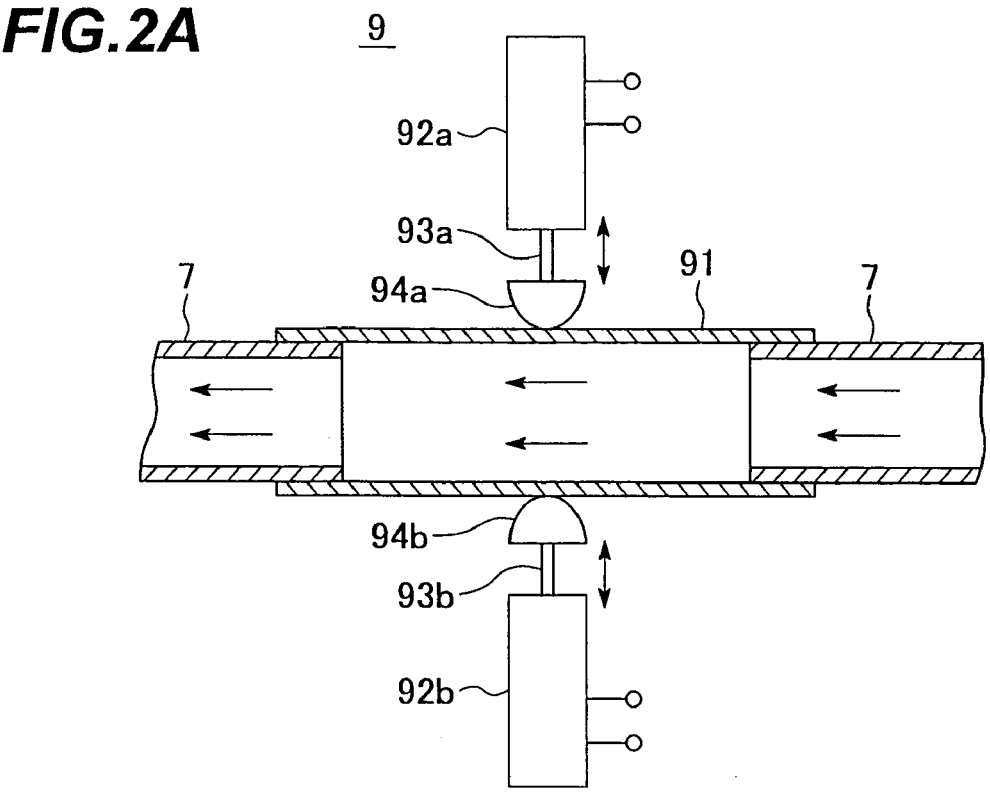
Figure 2B:
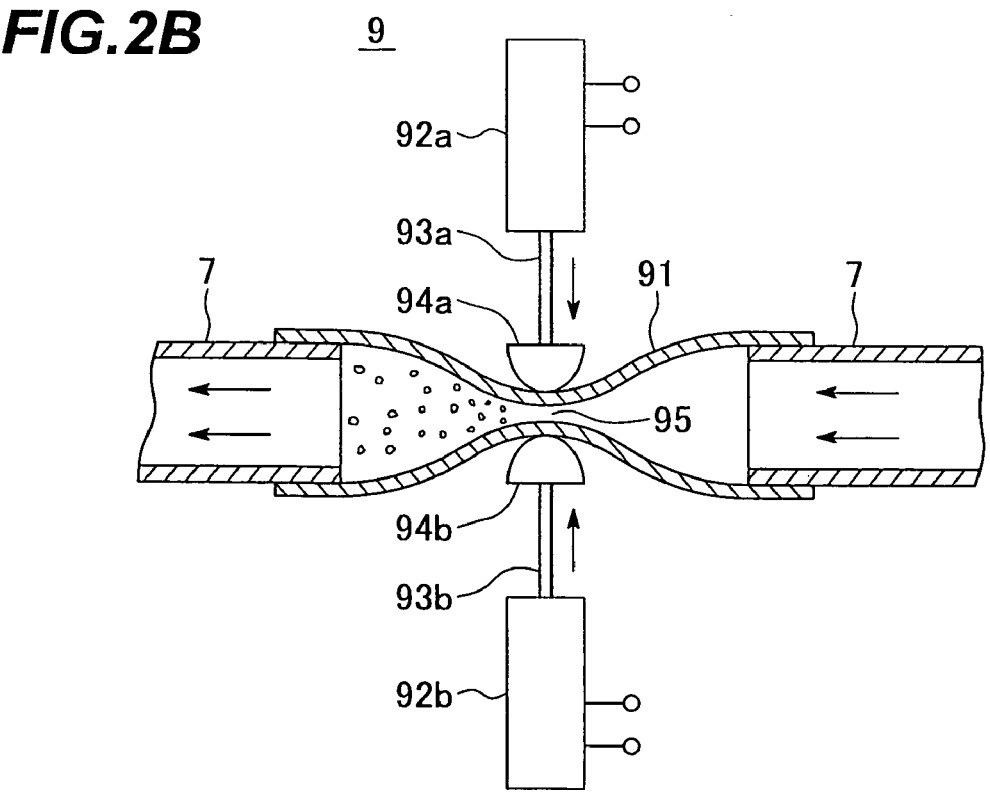

A specific construction example of the deaeration device 9 is shown in FIG. 2A and FIG. 2B.

The illustrated deaeration device 9 is provided with a deformable elastic tube 91 with a predetermined length, in which two actuators 92a, 92b are oppositely arranged in the vicinity of the center of this elastic tube 91 and pressers 94a, 94b for pressing/deforming the elastic tube 91 are mounted at the tip ends of piston rods 93a, 93b of the oppositely arranged two actuators. As a material of the elastic tube 91, it is desirable to use fluoro-rubber or the like having resistance against hydrocarbon-based or solvent-type cleaning liquid as well.

This deaeration device 9 includes such an arrangement so as to advance/retreat the piston rods 93a, 93b by driving the actuators 92a, 92b, press and squeeze the elastic tube 91 with the pressers 94a, 94b at their tip ends, and to form a throttle portion 95 whose opening area is decreased (see FIG. 2B) by narrowing the inside sectional area of that portion. When the cleaning liquid reaches this throttle portion 95, the flow velocity is accelerated according to the throttle amount, the dynamic pressure of the cleaning liquid is rapidly raised, while the static pressure is rapidly lowered, and after passing through the throttle portion 95, the inside sectional area of tube is widened and the flow velocity is slowed, which rapidly lowers the dynamic pressure of the cleaning liquid and rapidly raises the static pressure.

When the above rapid pressure change occurs at the throttle portion 95, cavitation is generated on the downstream side of the throttle portion 95 and the dissolved air having been dissolved in the cleaning liquid emerges as air bubbles. Thereby, the air dissolved in the cleaning liquid can be separated from the cleaning liquid as air bubbles. Strength of the separation action of the dissolved air by cavitation can be controlled by an opening area of the throttle portion 95 of the elastic tube 91, that is, forward/backward movement amounts of the piston rods 93a, 93b of the actuators 92a, 92b.

In the above example, the elastic tube 91 is pressed/deformed using the two actuators 92a, 92b, but pressing/deformation may be performed by using a single actuator. Also, a piston-rod type actuator is used, but any type or structure may be used as long as the pressers 94a, 94b can be moved forward/backward, and various moving mechanism, for example, a screw type, rack and pinion type or the like can be used.

Next, control methods of the dissolved air concentration in the above-constituted ultrasonic cleaning device will be described.

{1} Control Example 1

The first control example is for controlling the dissolved air concentration in the cleaning liquid using measurement results of the dissolved air concentration sensor 14. The control method will be described below.

When the ultrasonic cleaning device is powered on, the control device 17 drives the circulating pump 8 and suctions the cleaning liquid 2 in the cleaning tank 1 into the cleaning-liquid circulation path 7 through the cleaning liquid suction port 5 at the upper part of the tank. Then after one circulation cycle of the cleaning-liquid in the circulation path 7, the cleaning liquid 2 is discharged into the cleaning tank 1 again through the cleaning liquid discharge port 6 at the lower part of the tank and thus the cleaning liquid 2 is circulated. Also, the heater 4 is controlled as necessary so that the temperature of the cleaning liquid 2 is controlled to a regular temperature based on the liquid temperature signal outputted by the liquid temperature sensor 13.

In this state, the control device 17 takes in the dissolved air concentration signal sent from the dissolved air concentration sensor 14 and monitors to see if the dissolved air concentration of the cleaning liquid at that time is larger or smaller than a specified value predetermined in advance. As described above, when the dissolved air concentration is larger than the specified value, sound pressure of the ultrasonic wave irradiated from the ultrasonic wave generator 3 is rapidly lowered, which makes it difficult to perform favorable ultrasonic cleaning.

Then, if the dissolved air concentration is larger than the specified value, the control device 17 sends a control signal to the deaeration device 9 to drive the actuators 92a, 92b of the deaeration device 9 to advance the piston rods 93a, 93b so that the elastic tube 91 is pressed/deformed by the pressers 94a, 94b at the tip ends thereof to form the throttle portion 95 (See FIG. 2(*b*)).

When the throttle portion 95 is formed at the elastic tube 91, cavitation is generated on the downstream side of the throttle portion 95 as described above, and air dissolved in the cleaning liquid merges as air bubbles. This dissolved air which has emerged as air bubbles is discharged into the cleaning tank 1 again through the cleaning liquid discharge port 6 together with the cleaning liquid, but the air bubbles discharged into the cleaning tank 1 is raised through the cleaning liquid 2 by buoyancy and ejected from the liquid surface of the cleaning tank to the outside of the tank.

By repeating the above bubbling of the dissolved air by cavitation, the cleaning liquid 2 in cleaning tank 1 is gradually deaerated, and the dissolved air concentration becomes lower than the specified value predetermined in advance. When the dissolved air concentration becomes lower than the specified value, an object to be cleaned (not shown) is immersed in the cleaning liquid 2, and ultrasonic cleaning is started by irradiating ultrasonic wave from the ultrasonic wave generator 3. Thereby, efficient and favorable ultrasonic cleaning can be carried out without sound pressure drop.

The control device 17 monitors the dissolved air concentration signal outputted by the dissolved air concentration sensor 14 even during the ultrasonic cleaning process and controls the throttle amount of the deaeration device 9 so that the dissolved air concentration in the cleaning liquid does not become not less than the specified value. Owing to this, the dissolved air concentration of the cleaning liquid 2 in the cleaning tank 1 can be maintained below the specified value all the time, and favorable ultrasonic cleaning without sound pressure drop can be maintained.

Moreover, at this time, if the dissolved air concentration in the cleaning liquid becomes too smaller than the specified value, control may be made to raise the dissolved air concentration by also controlling the air supply valve 10 so as to open the air supply valve 10 to feed air into the cleaning liquid flowing through the cleaning-liquid circulation path 7. By using the air supply control by the air supply valve 10 at the same time, the dissolved air concentration can be maintained within a certain range around the specified value, and more favorable ultrasonic cleaning can be realized.

According to the experiments by the inventors, the dissolved air concentration for favorable ultrasonic cleaning should not be too small and found out to be desirably set at not less than 2.5 mg/l. Therefore, the specified value of the target dissolved air concentration is desirably not less than this value.

Moreover, in the above ultrasonic cleaning device, since the cleaning liquid suction port 5 and the cleaning liquid discharge port 6 of the cleaning-liquid circulation path 7 are provided on the upper part and the lower part of the tank wall on the opposing sides of the cleaning tank 1, the cleaning liquid discharged through the cleaning liquid discharge port 6 flows upward diagonally crossing the cleaning tank 1 and suctioned again through the cleaning liquid suction port 5 into the cleaning-liquid circulation path 7. Thus, the cleaning liquid throughout the cleaning tank is effectively agitated, and homogenization of the dissolved air concentration of the cleaning liquid 2 in the cleaning tank 1 can be accelerated.

Moreover, in the above control of the dissolved air concentration, the throttle amount (inside sectional area) of the throttle portion 95 in the deaeration device 9 may be constant (constant sectional area) irrespective of the magnitude of the dissolved air concentration, but it is preferable that the throttle amount is controlled so that the amount is varied in proportion to the magnitude of deviation of the dissolved air concentration from the specified value. By this, the dissolved air concentration can be lowered to the specified value in a short time.

Similarly, the valve opening degree of the air supply valve 10 may be varied in proportion to the magnitude of deviation of the dissolved air concentration from the specified value so that the dissolved air concentration which has been lowered too much can be returned to the specified value in a short time, and the dissolved air concentration can be maintained in a certain range more surely.

{2} Control Example 2

The second control example is for controlling a circulation amount of the cleaning liquid by the circulating pump 8 to further homogenize the dissolved air concentration of the cleaning liquid 2 in the cleaning tank 1.

As mentioned above, in the present invention, the cleaning liquid suction port 5 and the cleaning liquid discharge port 6 of the cleaning-liquid circulation path 7 are provided at the upper and lower positions of the opposing tank walls of the cleaning tank 1 so as to create a diagonally upward flow of cleaning liquid, by which the cleaning liquid in the cleaning tank 1 is agitated to homogenize the dissolved air concentration, but by controlling a circulating amount of the cleaning liquid circulating through the cleaning-liquid circulation path 7, further homogenization can be promoted.

That is, by controlling the circulating pump 8 by the control device 17, the number of revolution is changed or on/off controlled by a certain cycle or a variable cycle so as to change the flow rate of the cleaning liquid flowing through the cleaning-liquid circulation path 7. Owing to this, the flow rate of the cleaning liquid discharged from the cleaning liquid discharge port 6 into the cleaning tank 1 is changed, which further increases agitation of the cleaning liquid and accelerates homogenization of the dissolved air concentration.

{3} Control Example 3

The third control example is an example for controlling of the dissolved air concentration by timer operation.

Generally, cleaning conditions in the ultrasonic cleaning device are determined by an object to be cleaned and specification of the cleaning device. Therefore, after the dissolved air concentration is controlled to the specified value by the control operation as shown in the above-mentioned control example 1, the dissolved air concentration is subject to be gradually deteriorated in a rising rate according to the cleaning conditions at that time. Therefore, if this rising rate of the dissolved air concentration is known in advance, the dissolved air concentration of the cleaning liquid can be maintained within a specified range by intermittent timer operation even though the above-mentioned control operation in the control example 1 is not performed all the time.

Then, this rising rate of the dissolved air concentration is acquired in advance by experiments or actual ultrasonic cleaning processing and a predetermined time interval determined by the rising rate is set in the control device 17 as a timer operation time. And when the dissolved air of the cleaning liquid 2 concentration reaches the specified value by the above-mentioned control operation of the control example 1, the circulating pump 8 is stopped to stop deaeration processing and when the set timer time has elapsed, the circulating pump 8 is driven again so that the dissolved air concentration is controlled to be reduced by the timer operation. By repeating this, the dissolved air concentration can be maintained within a specified range without continuously performing the control operation. Thereby, cleaning cost can be reduced.

{4} Control Example 4

The fourth control example is an example for controlling the dissolved air concentration in such a way that the time-series data of input/output signals of the ultrasonic cleaning device is analyzed using the computer 18 built in or attached to the control device 17, the ultrasonic cleaning device is constructed as a multivariate autoregressive model having a plurality of state quantities such as the dissolved air concentration as input/output on software and thus the dissolved air concentration is controlled based on this constructed multivariate autoregressive model.

As described above, the ultrasonic sound pressure in the cleaning tank 1 in ultrasonic cleaning is largely changed by the dissolved air concentration in the cleaning liquid, while the dissolved air concentration is dispersed in a wide range due to the shape of the cleaning tank, circulating state or temperature of the cleaning liquid, outside temperature, humidity, etc. Therefore, depending on the use situation of the cleaning device, it becomes difficult to accurately specify the dissolved air concentration only from a specific state quantity such as only the dissolved air concentration of the cleaning liquid, or only the temperature of the cleaning liquid and the outside temperature. Then, in place of the above-mentioned control using only the dissolved air concentration in the control example 1, the ultrasonic cleaning device is constructed as a multivariate autoregressive model and the dissolved air concentration is controlled based on this multivariate autoregressive model.

The multivariate autoregressive modeling of the ultrasonic cleaning device is realized on software by performing the following steps of processing by the computer 18 attached to the control device 17. To make the explanation easy to understand, an example of construction of the multivariate autoregressive model having three state quantities as input/output, which are dissolved air concentration, temperature of the cleaning liquid and the room temperature will be described. However, even if other state quantities such as flow rate and humidity are added to the variables, processing itself can be performed in similar way simply with increased number of input/output variables.

(First Step)

First, time-series data on the dissolved air concentration, temperature of the cleaning liquid and room temperature are collected. For that purpose, the ultrasonic cleaning device is operated, and dissolved oxygen data outputted by the dissolved air concentration sensor 14, liquid temperature data outputted by the liquid temperature sensor 13 and room temperature data outputted by the room temperature sensor 15 are sampled for a predetermined time (10 to 15 minutes, for example) and collected.

(Second Step)

The obtained time-series data on the three state quantities which are dissolved air concentration, cleaning liquid temperature and room temperature, are analyzed by the computer 18 to construct a multivariate autoregressive model having the dissolved air concentration, cleaning liquid temperature and room temperature as input/output.

(Third Step)

Power contribution rate and impulse response (closed system) of the dissolved air concentration, cleaning liquid temperature and room temperature are calculated from analysis by the obtained multivariate autoregressive model.

(Fourth Step)

From the impulse response of the dissolved air concentration, "standard time of dissolved air concentration change" (time till the dissolved air concentration becomes below a regulation which is a target specified value) is calculated.

(Fifth Step)

A state model of the dissolved air concentration is made from the power contribution rate and a value of the impulse response, and an "estimated time of dissolved air concentration change" is calculated through modifying the "standard time of dissolved air concentration change" calculated based on the state model.

(Sixth Step)

From the obtained "estimated time of dissolved air concentration change", a deaeration amount (or deaeration time) till the dissolved air concentration becomes the specified value is calculated.

(Seventh Step)

Based on the above calculated deaeration amount (or deaeration time), the throttle amount (or deaeration time) of the deaeration device 9 is controlled by the control device 17 so that the dissolved air concentration falls within the specified range.

By using the above multivariate autoregressive model, the entire ultrasonic cleaning device can be handled in statistical processing. Therefore, even if state quantities such as dissolved air concentration, liquid temperature, room temperature, flow rate, humidity, ultrasonic sound pressure or the like are in a complicated relation and the state quantities can not be clearly associated with each other, the dissolved air concentration of the cleaning liquid can be controlled rapidly and accurately.

In the above example, the time-series data on each state quantity are collected immediately before starting the ultrasonic cleaning, but the multivariate autoregressive model can be constructed using the time-series data of each state quantity collected/accumulated at previous ultrasonic cleaning operation.

Also, it may be so constituted that a learning function is given so that the time-series data of each of the above state quantities are collected at every certain period even after the ultrasonic cleaning of an object to be cleaned is started and the first configured multivariate autoregressive model is modified based on the collected new time-series data. By giving such a learning function, the constructed multivariate autoregressive model can be evolved closer to behavior of the actually operating ultrasonic cleaning device, and more excellent ultrasonic cleaning can be realized.

{5} Control Example 5

The fifth control example is an example of using a propeller-type pump and for controlling the dissolved air concentration of the cleaning liquid to fall within a range of 2.5 to 3.5 mg/l.

As described before, if the propeller-type pump is used as the circulating pump 8 to circulate the cleaning liquid 2, when air bubbles generated by the deaeration device 9 reaches the circulating pump 8, the air bubbles are sheared by the rotating propeller of the circulating pump 8 into finer level to be extremely minute air bubbles with a diameter of 10 to several tens μm, so-called "micro bubbles". When these micro bubbles are generated, uniform distribution of the cleaning liquid 2 in the cleaning tank 1 is further accelerated by the function of the micro bubbles, which homogenizes the dissolved air concentration over the entire area of the cleaning tank and realizes ultrasonic cleaning not affected by environmental changes such as room temperature, humidity or atmospheric pressure. Also, stains in the cleaning liquid hardly coagulate, and generation of a large mass of stains is prevented.

Figure 3:
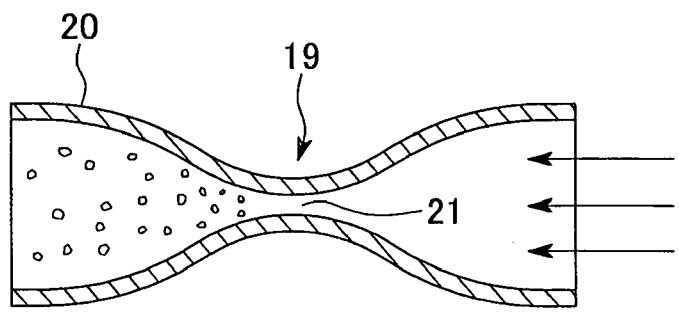
FIG. 3 is a view showing a second example of the deaeration device.

FIG. 3 shows a second example of the deaeration device.

The deaeration device 19 to be the second example is made of a rigid pipe 20 which is not deformable such as metal or hard plastic in its entirety, and by narrowing the diameter of the rigid pipe 20 at an appropriate position, a fixed-type throttle portion 21 is formed on the way of the flow passage through which the cleaning liquid flows.

Figure 4A:
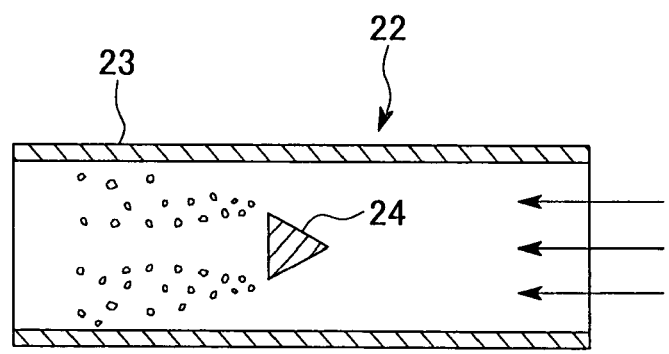
FIG. 4A is a view showing a third example of the deaeration device and FIG. 4B is a view showing a fourth example of the deaeration device.
Figure 4B:
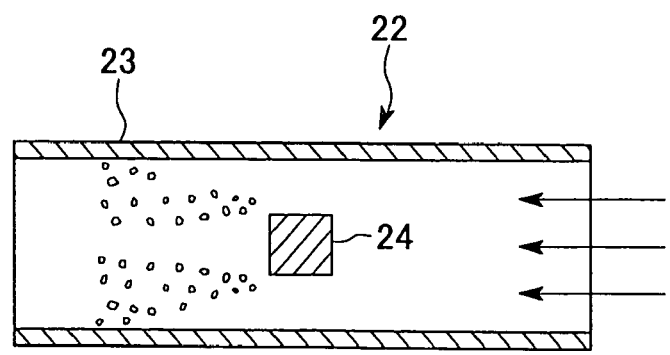

FIG. 4A and FIG. 4B show a third and a fourth examples of the deaeration device.

FIG. 4A shows the third example, in which an obstacle 24 with a triangular section is arranged perpendicularly in a cylindrical pipe line 23 in a direction blocking the flow of the cleaning liquid. FIG. 4B shows the fourth example, in which the obstacle 24 with a rectangular section is arranged perpendicularly in the cylindrical pipe line 23 in a direction blocking the flow of the cleaning liquid. In a deaeration device 22 in the third and fourth examples, turbulence is generated by resisting the flow of the cleaning liquid by the obstacle 24 so that cavitation is generated at the rear of the obstacle 24 and the dissolved air in the cleaning liquid is bubbled.

Figure 5:
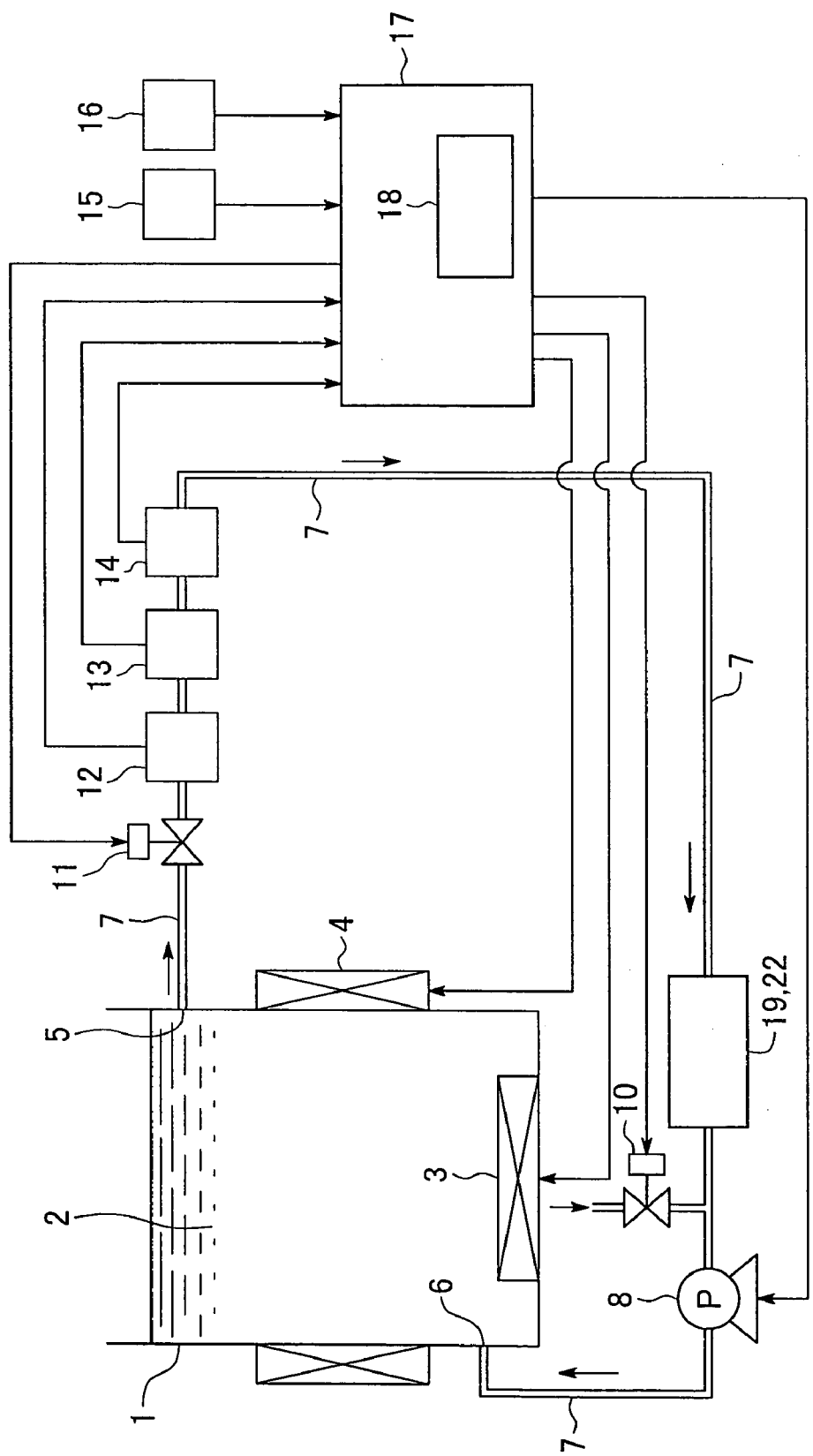
FIG. 5 is a diagram showing an example of the ultrasonic cleaning device constructed using the deaeration device in the second to fourth examples.

An example of application of the deaeration devices 19, 22 in the above second to fourth examples to the ultrasonic cleaning device of the present invention is shown in FIG. 5. In the deaeration devices 19, 22 in the second to fourth examples, the throttle portion 21, the obstacle 24 are fixed and their throttle amounts or shapes can not be changed, but by controlling the circulating pump 8, air supply valve 10, flow-rate control valve 11 or the like by the control device 17, the dissolved air concentration of the cleaning liquid 2 can be freely adjusted. Moreover, control using the above-mentioned multivariate autoregressive model and ultrasonic cleaning using micro bubbles are similarly available.

Figure 6:
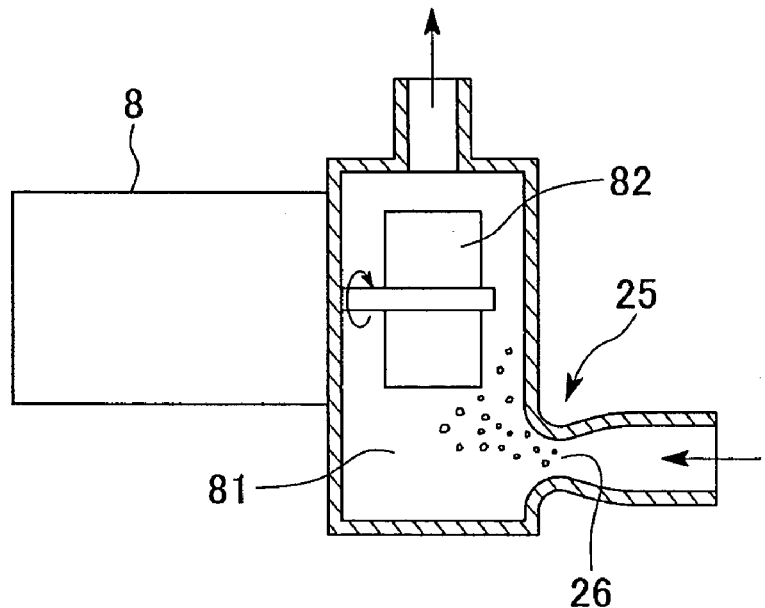
FIG. 6 is a view showing a fifth example of the deaeration device.

FIG. 6 shows a fifth example of the deaeration device.

In a deaeration device 25 to be the fifth example, a throttle portion 26 is formed by narrowing a diameter of a cleaning liquid inlet of a pump chamber 81 of the circulating pump 8 connected to the cleaning-liquid circulation path, and the circulating pump 8 and the deaeration device 25 are constituted integrally. Reference numeral 82 denotes a propeller (rotating blade) for supplying the cleaning liquid.

Figure 7:
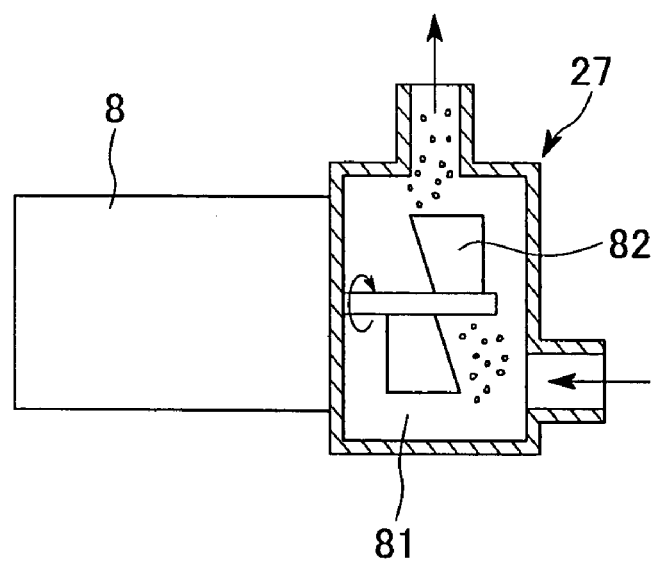
FIG. 7 is a view showing a sixth example of the deaeration device.

FIG. 7 shows a sixth example of the deaeration device.

In a deaeration device 27 to be the sixth example, the blade profile of the propeller 82 arranged in the pump chamber 81 of the circulating pump 8 connected to the cleaning-liquid circulation path for supplying the cleaning liquid is made asymmetrical so that cavitation is generated around the rotating propeller 82. In this sixth example, too, the circulating pump 8 and the deaeration device 27 are constituted integrally.

Figure 8:
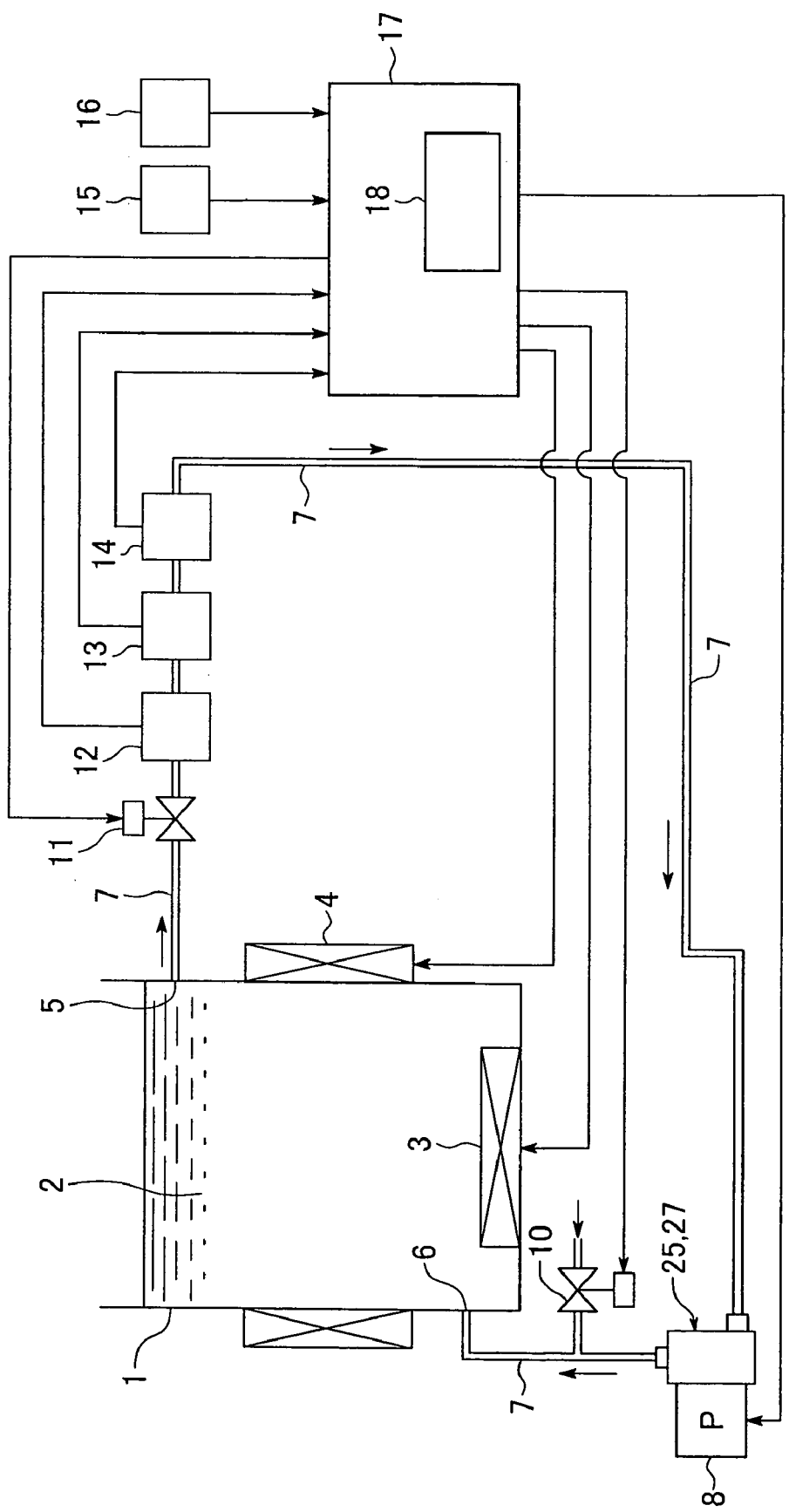
FIG. 8 is a view showing an example of the ultrasonic cleaning device constructed using the deaeration device in the fifth and sixth examples.

An example of application of the deaeration devices 25, 27 in the above fifth or sixth example to the ultrasonic cleaning device of the present invention is shown in FIG. 8. In the case of the deaeration devices 25, 27 in the fifth and sixth examples, too, as with the deaeration device in the above second to fourth examples, the dissolved air concentration in the cleaning liquid can be adjusted by controlling the circulating pump 8, air supply valve 10, flow-rate control valve 11 or the like by the control device 17. Moreover, control using the above-described multivariate autoregressive model and ultrasonic cleaning using micro bubbles are also available.

The invention claimed is:

1. An ultrasonic cleaning device comprising:

an ultrasonic wave generator;

a cleaning tank attached with said an ultrasonic wave generator for being filled with cleaning liquid for ultrasonic cleaning of an object to be cleaned by immersing the object to be cleaned in said cleaning tank and irradiating an ultrasonic wave from said ultrasonic wave generator;

a cleaning-liquid circulation path formed so that the cleaning liquid in said cleaning tank is circulated through a predetermined path and returned into said cleaning tank;

a circulating pump for suctioning the cleaning liquid in said cleaning-liquid circulation path for circulation; and a deaeration device disposed in said cleaning-liquid circulation path, wherein said deaeration device has an obstacle arranged in said cleaning-liquid circulation path to generate turbulence by resisting the flow of the cleaning liquid through said cleaning-liquid circulation path; and wherein dissolved air in the cleaning liquid flowing through said cleaning-liquid circulation path is bubbled by generating cavitation on a downstream side of said obstacle and the bubbled dissolved air flows back into said cleaning tank together with the cleaning liquid so that the bubbled dissolved air is ejected from a liquid surface of the cleaning liquid in said cleaning tank to an outside of said cleaning tank.

2. The ultrasonic cleaning device according to claim 1, wherein said obstacle is a throttle portion provided in of said cleaning-liquid circulation path and said throttle portion is formed by narrowing an inside sectional area of said cleaning-liquid circulation path.

3. The ultrasonic cleaning device according to claim 2, further comprising a deformable elastic tube provided in said cleaning-liquid circulation path and a tube-sectional-area varying mechanism which is attached to said elastic tube and is operable to vary said inside sectional area in of said cleaning-liquid circulation path by pressing said elastic tube, wherein said throttle portion is formed by pressing operation of said tube-sectional-area varying mechanism.

4. The ultrasonic cleaning device according to claim 2, further comprising a rigid pipe provided in said cleaning-liquid circulation path, wherein said throttle portion is formed by narrowing a diameter of said rigid pipe.

5. The ultrasonic cleaning device according to claim 2, further comprising an air supply means connected to said cleaning-liquid circulation path, said air supply means being capable of variable valve opening degrees and being disposed on a downstream side of said deaeration device such that air can be supplied into the cleaning liquid flowing through said cleaning-liquid circulation path through said air supply means.

6. The ultrasonic cleaning device according to claim 2, further comprising:

a cleaning-liquid suction port on an upper part of said cleaning tank, said cleaning-liquid suction port being provided for suctioning cleaning liquid in said cleaning tank into said cleaning liquid circulation page; and a cleaning-liquid discharge port on a lower part of said cleaning tank on a side opposite to said cleaning-liquid suction port, said cleaning-liquid discharge port being provided for discharging the cleaning liquid in said cleaning liquid circulation path into said cleaning tank.

7. The ultrasonic cleaning device according to claim 2, wherein a flow of the cleaning liquid in said cleaning tank is changed by changing a circulating amount of the cleaning liquid through control of said circulating pump so that the dissolved air concentration in said cleaning tank becomes uniform.

8. The ultrasonic cleaning device according to claim 2, wherein the dissolved air concentration of the cleaning liquid is controlled to be not less than 2.5 mg/l.

9. The ultrasonic cleaning device according to claim 1, further comprising an air supply means connected to said cleaning-liquid circulation path, said air supply means being capable of variable valve opening degrees and being disposed on a downstream side of said deaeration device such that can be supplied into the cleaning liquid flowing through said cleaning-liquid circulation path through said air supply means.

10. The ultrasonic cleaning device according to claim 1, further comprising:

a cleaning-liquid suction port on an upper part of said cleaning tank, said cleaning-liquid suction port being provided for suctioning cleaning liquid in said cleaning tank into said cleaning liquid circulation path; and a cleaning-liquid discharge port on a lower part of said cleaning tank on a side opposite to said suction port, said cleaning-liquid discharge port being provided for discharging the cleaning liquid in said cleaning liquid circulation path into said cleaning tank.

11. The ultrasonic cleaning device according to claim 1, wherein a flow of the cleaning liquid in said cleaning tank is changed by changing a circulating amount of the cleaning liquid through control of said circulating pump so that the dissolved air concentration in said cleaning tank becomes uniform.

12. The ultrasonic cleaning device according to claim 1, wherein the dissolved air concentration of the cleaning liquid is controlled to be not less than 2.5 mg/l.

* * * * *